Dec. 30, 1930. A. G. SCOTT 1,787,091
TROLLEY EAR AND ATTACHMENT THEREFOR
Filed Aug. 5, 1929
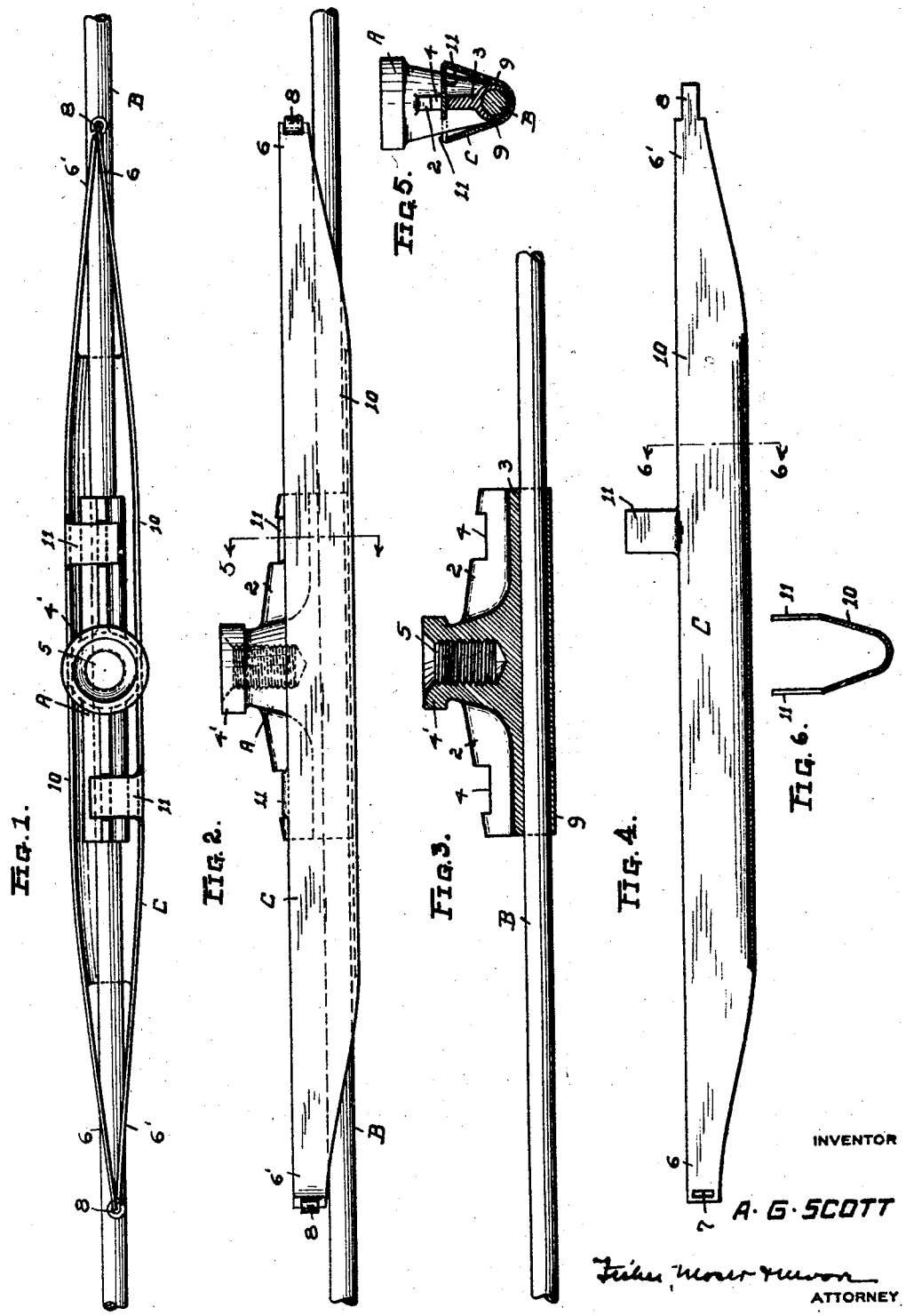
INVENTOR
A. G. SCOTT
ATTORNEY Patented Dec. 30, 1930

1,787,091

UNITED STATES PATENT OFFICE

ANGUS G. SCOTT, OF SHAKER HEIGHTS, OHIO

TROLLEY EAR AND ATTACHMENT THEREFOR

Application filed August 5, 1929. Serial No. 383,764.

My invention relates to an improvement in trolley ears and attachments therefor, and in general my object is to provide a protecting device of simple and inexpensive construction which may be readily attached to and detached from the trolley ear and which will greatly prolong the life thereof.

In the accompanying drawings, Fig. 1 is a plan view of a trolley ear supporting a trolley wire, including my improved protecting device attached thereto, and Fig. 2 is a side elevation of the same part. Fig. 3 is a sectional view of the trolley ear, without the protecting device, and Fig. 4 is a longitudinal sectional view of the protector as it appears removed and apart from the trolley ear, Fig. 5 is a cross section of the ear and protector secured together, on line 5—5 of Fig. 2. Fig. 6 is a cross sectional view of the protector itself, on line 6—6 of Fig. 4.

The present trolley ear A is constructed very closely to the ones in general use, excepting that it embodies longitudinal ribs 2 at the top of its channeled base portion 3, which ribs have notches or shouldered portion 4—4 in their upper edges near the ends thereof. The round enlargement 4' at the center contains a screw-threaded opening 5 to permit the ear to be connected to suspensory means as usual. The channeled base portion 3 is also fashioned as customarily to receive and clamp a trolley wire, B. Thus, excepting for the notches or shouldered depressions in ribs 2, the trolley ear is constructed according to standard practices. In use, the wear on such trolley ears comes mainly on the clamping jaws for the trolley wire, and to avoid such wear, I provide a protecting sheath C of sheet metal which may be bent around the trolley ear and fastened detachably thereto without the aid of any other fastening means than that provided on the sheath itself.

Thus, the sheath is stamped from a flat sheet of metal having good electrical conductive properties, the end portions of the stamping being forked or bifurcated to provide a pair of relatively long and flexible extensions 6—6' at each end. One extension of each pair is formed with a slot or opening 7, and the other is provided with a tongue 8 adapted to be inserted within said slot and then bent or curled to interlock the extremities together after the sheath has been slipped over the trolley ear and wire as delineated in Figs. 1 and 2. To foster that purpose the sheath is folded on curved lines on its longitudinal medial line to fit the round clamping jaws 9—9 of the trolley ear, and the sides 10—10 of the sheath are flat and straight and bent upwardly on diverging slanting lines to a substantial distance above the trolley wire, for example, to approximately the same horizontal plane as the upper notched edge of the ribs 2 on the ear. Each side wall 10 of the sheath is further provided with one or more bendable lugs or projections 11 adapted to be folded laterally over the ribs 2 and into the shouldered depressions or notches 4—4 therein, thereby locking the sheath at its middle in substantially rigid engagement with the trolley ear. Seating of the lugs or projections 11 within the notches prevents longitudinal displacement of the sheath in respect to the trolley ear and the sheath is also suspended from the trolley ear with a tight and close fit at the bottom thereof.

When the sheath is fastened to the ear and its divided extremities rigidly connected together above the trolley wire, the flaring side walls of the sheath are spread somewhat farther apart than the flaring sides of the annular groove in the customary trolley wheel.

Accordingly when the trolley wheel rides along the wire it first passes the connected extremities of the sheath, and then the flanges of the wheel engage the bowed and spreading side walls of the sheath, thereby transferring the riding contact of the wheel from the base of its groove to the side flanges, or should the groove in the trolley wheel be wide enough to permit its base portion to contact with the rounded bottom of the sheath the trolley ear itself is not directly engaged and wear on the clamping jaws is prevented. The sheath takes the entire wear, and is inexpensive compared to the cost of the trolley ear, and the cost of detaching and replacing worn sheaths is reduced also by the simple construction of sheath herein shown and described.

What I claim, is:

1. A detachable protecting device for a trolley ear rigidly attached to a trolley wire, comprising a metal sheath, and readily-releasable means integral with the sheath for fastening said sheath detachably to said ear.

2. A detachable protecting device for a trolley ear, comprising a metal sheath, of trough shape having divided flexible extremities detachably secured together, and readily-releasable means for fastening said sheath detachably to said ear.

3. A detachable protecting device for a trolley ear rigidly attached to a trolley wire, comprising a trough-shaped sheath made of sheet metal having foldable portions for securing the sheath rigidly but in readily-releasable engagement with a trolley ear.

4. A detachable protecting device for a trolley ear which includes means for gripping a trolley wire, comprising a metal sheath of trough shape having side walls provided with foldable attachment lugs for securing the sheath detachably to a trolley ear.

5. A detachable protecting device for a trolley ear, comprising a metal sheath having divided ends adapted to be secured together over a trolley wire and formed with flaring side walls having means at their upper edges adapted to be folded into interlocking connection with a trolley ear.

6. A detachable protecting device for a trolley ear, comprising a metal sheath made of sheet metal folded into trough shape and formed with divided ends adapted to be flexed and secured together over a trolley wire, and provided further with means adapted to overlap and secure the sheath releasably upon a trolley ear.

7. A trolley ear provided with clamping means for gripping a trolley wire and having shouldered portions, in combination with a sheath having means adapted to engage said shouldered portions and secure the sheath releasably to said ear.

8. A trolley ear provided with means for gripping a trolley wire and including a notched rib, in combination with a sheath of trough-shape having locking projections engaged with said notched rib.

9. The combination of a trolley wire, a trolley ear rigidly attached to said wire and a metal sheath for said ear having integral readily releasable means for connecting said sheath to said ear.

10. The combination of a trolley wire, a trolley ear rigidly attached to said wire, and a metal sheath for said ear having readily releasable means integral with the sheath for connecting said sheath to said ear and to said wire.

11. The combination of a trolley wire, a trolley ear rigidly attached to said wire, and a metal sheath of trough-shape including a centrally arranged means to releasably connect said sheath to said ear, and means to secure the walls at opposite ends of said sheath together over said trolley wire.

12. The combination of a trolley wire, a trolley ear having clamping portions rigidly gripping said trolley wire and a sheath of trough-shape having divided ends, and means integral with the sheath to releasably connect said sheath with said wire and ear.

In testimony whereof I affix my signature.

ANGUS G. SCOTT.